United States Patent
Bernard et al.

(10) Patent No.: US 8,078,425 B2
(45) Date of Patent: Dec. 13, 2011

(54) DEVICE FOR DETECTING THE ANGULAR POSITION OF A ROTOR OF A POLYPHASE ROTARY ELECTRICAL MACHINE AND ROTARY ELECTRICAL MACHINE CONTAINING SUCH A DEVICE

(75) Inventors: François-Xavier Bernard, Creteil (FR); Christophe Louise, Alfortville (FR); Hugues Doffin, Chatenay Malabry (FR)

(73) Assignee: Valeo Equipements Electriques Moteur, Creteil (FR)

( * ) Notice: Subject to any disclaimer, the term of this patent is extended or adjusted under 35 U.S.C. 154(b) by 449 days.

(21) Appl. No.: 12/464,465

(22) Filed: May 12, 2009

(65) Prior Publication Data
US 2009/0292501 A1 Nov. 26, 2009

(30) Foreign Application Priority Data
May 23, 2008 (FR) ...................................... 08 53359

(51) Int. Cl.
*G01C 19/06* (2006.01)
(52) U.S. Cl. .......... 702/151; 702/127; 702/150; 702/94; 702/145; 702/189; 318/400.1; 318/400.37; 318/400.38
(58) Field of Classification Search .................. 702/127, 702/150–151
See application file for complete search history.

(56) References Cited

U.S. PATENT DOCUMENTS

| 5,006,768 A | * | 4/1991 | Rozman | .................... 318/400.11 |
| 5,182,500 A | | 1/1993 | Shimada | |
| 2008/0309266 A1 | * | 12/2008 | Chemin et al. | ........... 318/400.02 |

FOREIGN PATENT DOCUMENTS

| EP | 1 172 925 A2 | 1/2002 |
| FR | 2 896 638 | 7/2007 |
| WO | WO 2006/010864 | 2/2006 |

* cited by examiner

*Primary Examiner* — Drew A Dunn
*Assistant Examiner* — Mischita Henson
(74) *Attorney, Agent, or Firm* — Berenato & White, LLC

(57) ABSTRACT

A device for detecting the angular position of a rotor of a polyphase rotary electrical machine contains a stator and a plurality of magnetic field sensors (200) delivering first signals (2001-2003) representing a magnetic field. The device includes means (201) for generating, from linear combinations of the first signals, first (2010) and second (2011) sinusoidal signals, phase-shifted by a determined value $\phi$ representing an angular position of the rotor, referred to as real. The device includes means for detecting a value for an angular position of the rotor referred to as estimated (221) by locking between the real and the estimated angular positions using a feedback loop known as a "tracking" loop (214-216, 215-207). The device may relate to a polyphase rotary electrical machine containing such a device.

13 Claims, 4 Drawing Sheets

DEVICE FOR DETECTING THE ANGULAR POSITION OF A ROTOR OF A POLYPHASE ROTARY ELECTRICAL MACHINE AND ROTARY ELECTRICAL MACHINE CONTAINING SUCH A DEVICE

This application claims foreign priority benefit under 35 U.S.C. §119 of French patent application no. 08/53359, filed on May 23, 2008, which application is incorporated herein by reference.

BACKGROUND OF THE INVENTION

1. Field of the Invention

The invention concerns a device for detecting the angular position of a rotor of a polyphase rotary electrical machine containing a stator.

The invention also concerns a rotary electrical machine containing such a device.

It is especially suitable for reversible machines, known as alternator-starters, which are used in the vehicle industry, both in alternator mode and in starter mode, or as an aid to moving off (boost mode), typically from 500 rpm.

2. Description of Related Art

Within the context of the invention, the term "polyphase" concerns more specifically three-phase or hexaphase rotary electrical machines, but may also concern biphase rotary electrical machines or those which operate at a higher number of phases.

For the sake of clarity, the following scenario relates to the preferred application of the invention, i.e. the case of a reversible three-phase rotary electrical machine of the alternator-starter type, without this in any way limiting the scope of the invention.

As is well known, a reversible rotary electrical machine contains an alternator comprising:

a rotor constituting an inductor, traditionally combined with two collector rings and two brushes to supply an excitation current; and a polyphase stator, bearing several coils or windings, three in the embodiment in question, constituting an armature, which are star-connected, or most often as a triangle in the case of a three-phase structure, and which deliver converted electrical power to a bridge rectifier when operating as an alternator. The machine includes two bearings, a front and a rear, to fix it to the thermal engine and to fix the stator. The stator surrounds the rotor. The rotor is carried by a shaft supported by the front and rear bearings. The brushes of an excitation circuit of the rotor are powered by a regulator of the alternator to maintain the output voltage of the alternator at a desired voltage to supply an electrical supply network containing a battery. The alternator enables any rotation movement of the inductor rotor driven by the thermal engine of the vehicle to be transformed into an electrical current induced in the coils of the stator.

The alternator may also be reversible and constitute an electric motor, or rotary electrical machine, enabling the thermal engine of the vehicle to be driven in rotation via the rotor shaft. This reversible alternator is known as an alternator-starter, or alterno-starter. It enables mechanical energy to be transformed into electrical energy, and vice versa.

Thus, in alternator mode, the alternator-starter specifically charges the vehicle battery, while in starter mode, the alternator-starter turns the motor vehicle's thermal engine, also known as internal combustion engine, in order to start it.

In reversible machines from the automotive industry, for example, operating in motor or starter modes, the stator must be current-controlled in such a way that at any moment the necessary torque can be applied to the rotor to impel the required rotation for the operation of the engine. The torque applied to the rotor, and hence the current supplied to the phases of the stator, is a sinusoidal function of the angular position of the rotor in relation to the stator, represented by an angle $\theta$.

FIG. 1, placed at the end of this description, illustrates in diagram form a complete system 1 for detecting the angular position $\theta(t)$ of the rotor of a three-phase alternator-starter and for controlling said organ, either in alternator mode or in engine (starter) mode.

The system 1 consists of four principal sub-systems: an alternator-starter 10, a reversible AC-DC power converter 11, a control module 13 for this converter and a module 12 for detecting the angular position $f$ of the rotor 100 (symbolised by an arrow turning about its axis of rotation $\Delta$).

The converter 11 generally consists of a bridge of electronic rectifiers, comprising three banks of MOSFET power transistors, under the single reference 110, one for each phase. A structure of this type is well known to the person skilled in the art and there is no need to describe it in further detail.

In alternator mode, the alternator-starter 10 supplies the converter 11 with three-phase AC current via its three outputs, 101 to 103, which correspond to the junctions between the three coils (not shown in FIG. 1) constituting the stator 104 of the alternator-starter 10. The latter converts the three-phase AC current into DC current so as to (re)charge the battery Bat with which the vehicle is equipped (not shown in FIG. 1). This, in turn, supplies various organs of this vehicle: on-board electronics, air conditioning, headlights, etc.

In engine mode, i.e. in starter mode, the alternator-starter 10 is supplied with three-phase electrical energy by the reversible converter 11, which is operating in three-phase current generator mode.

Whichever mode is considered, the MOSFET transistors 110 are controlled according to an appropriate sequence of six control signals, $SC_1$ to $SC_6$, generated by the control module 13. As is also well known, these signals $SC_1$ to $SC_6$ must be generated synchronously with the angular position $\theta$ of the rotor 100 which detects the relative phases of the currents supplied by the outputs 101 to 103 of the alternator-starter 10.

For this reason, it is necessary to detect this angular position $\theta$ with great precision, in order to achieve correct functioning of the bridge rectifiers, in particular to avoid any risk of deterioration of the semiconductor components, but also and above all, in engine or starter mode, to optimise the torque supplied by the alternator-starter 10.

This is the function which is devolved to the module 12 for detecting the angular position $\theta$ of the rotor 100 so as to generate a signal $\theta(t)$ representing the instantaneous variation of the measured angular position and to transmit it as an input to the control module 13.

In prior art, various methods have been proposed for this purpose.

Certain reversible electrical machines, especially those used in the automotive industry, are now equipped with a device known as a resolver, which is positioned at the end of the rotor shaft of the machine. Such a resolver is described, by way of non-exhaustive example, in the patent application US 2002/0063491 A1. The resolver itself contains a stator and a rotor which are fixed in relation to the respective stator and rotor of the reversible machine. The resolver measures the magnetic field produced by its own rotor. As this magnetic field is fixed in relation to said rotor, which is itself fixed in relation to the rotor of the machine, it represents the position of the actual rotor of the machine.

However, this type of equipment presents a certain number of disadvantages, in particular the following:

resolvers are quite expensive, and, to render them operational, their implementation is complex, due to the coupling to be effected between the resolver and the actual reversible machine, which necessitates the presence of an electronic calculation component to provide the correct position of the rotor of the reversible machine based on the coupling parameters.

Secondly, resolvers are sensitive to the magnetic interference caused by the stray magnetic field produced by the rotor, which causes malfunctioning of the system, thus errors of measurement and poor control of the machine. To limit this disadvantage, it is necessary to use magnetic protection, such as a stainless steel tube placed between the rotor and the resolver at the shaft end. Moreover, the mechanical strength of these devices is imperfect, since they are especially sensitive to vibrations from the machine due to being mounted on the shaft end of the rotor. Moreover, their size is a problem and is unlikely to enable greater compactness of the electrical machine.

Finally, their resistance to salt spray and dust is not completely satisfactory.

To alleviate these disadvantages, in international patent application WO 2006/010864 A2, the claimant proposed a device for detecting the position of a rotor of a rotary electrical machine containing a stator, which makes it possible to obtain the precise angular position sought, while at the same time being cheap, simple to operate and having low sensitivity to magnetic interference.

SUMMARY OF THE INVENTION

The device taught in this patent application contains a plurality of magnetic field sensors, fixed in relation to the stator of the rotary electrical machine and able to deliver first signals representing a rotating magnetic field detected by these sensors, and means for processing these first signals by an operator able to supply second signals depending on the angular position attained by the rotor.

In one embodiment, illustrated by FIG. 1, three linear Hall effect sensors $CA_1$ to $CA_3$ placed at 120° electric on the rotary electrical machine, in this case the alternator-starter 10, facing a target (not shown in FIG. 1) integral with the rotor 100 and magnetised alternately North/South for each pole of the machine. For a more detailed description, it would be advantageous to refer to the description in the previously cited international patent application WO 2006/010864 A2. FIG. 1 also shows an angular reference marker RRef θ physically connected to the rotor 100 of the alternator-starter 10.

FIG. 2, which is at the end of this description, illustrates in diagram form an example of a series of three signals, $CH_1$ to $CH_3$, delivered by the sensors, $CA_1$ to $CA_3$, with the alternator-starter 10 rotating at a fixed speed.

The ordinates axis is graduated in amplitudes, by way of example, for the sake of clarity, between 0 and 4.5V, and the abscissa axis in angles (degrees).

It has been found experimentally that the signals $CH_1$ to $CH_3$, which are referred to as "raw", usually contain a high level of harmonics, in particular a high level of harmonic 3 and their relative amplitudes are different. Hence, it is difficult to construct, from these far from perfect raw signals $CH_1$ to $CH_3$, signals which approach an ideal sinusoidal function (i.e. free from harmonics), with identical amplitudes, zero offsets and mutually phase-shifted in a non-obvious fashion (phase shift not a multiple of 180°).

The basic principle set out in international [application] WO 2006/010864 A2 is to find two distinct linear combinations which simultaneously enable the two sinusoids desired to be obtained, while at the same time finding the best possible solution to the problems raised above.

As a first approximation, it is possible to admit that the sensors $CA_1$ to $CA_3$ have identical, or at least very close, characteristics, that they are placed in an identical thermal and electromagnetic environment and thus that the signals delivered by these sensors retain some common characteristics. These hypotheses, as well as a fixed angular relation between these sensors, lead to the view that:

their offsets develop simultaneously as a function of any interference field (such as, for example, magnetisation of the rotor);

their levels of order 3 harmonics are very similar and in phase with their fundamental harmonics; and the electrical signals generated by these sensors are phase-shifted by about 120°.

These hypotheses make it possible to choose two linear combinations which partly cancel out the order 3 harmonic and the offsets. Simply by choosing, for linear combinations, the difference between two sensor output signals, one obtains two signals phase-shifted by 60° and which meet the selection criteria mentioned above.

FIG. 3, which is at the end of this description, illustrates in diagram form the result obtained. The ordinates axis is graduated in amplitudes, by way of example for the sake of clarity between −2V and +2V, and the abscissa axis in degrees. FIG. 3 also shows the phase shift φ between the two signals $C_1$ and $C_2$.

It is easy to see, on inspecting FIG. 3, that the two curves $C_1$ and $C_2$ are close to ideal sinusoidal functions. The signals represented by these curves are recentred and contain fewer harmonics than the raw signals (FIG. 2: $CH_1$ to $CH_3$).

Nevertheless, the amplitudes of these signals are not completely identical and their offsets are not absolutely zero. This mean that a factory calibration stage, at the end of the manufacturing chain, is necessary.

To do so, one may subtract an adjustable value from each of the signals in order to cancel each offset. This signed value can be obtained in purely analogue fashion, for example using a potentiometer or an adjustable resistive bridge (for example by using a procedure known as laser trimming) or semi-analogue, by using a digital value converted into an analogue value. Finally, a completely digital solution is also possible, if the signals are converted into digital signals.

With respect to amplitude calibration, a single adjustment is necessary, because it is sufficient for the signal amplitudes to be equal. To do so, a variable gain amplifier can be used. This variable gain amplifier can be purely analogue, semi-analogue or completely digital. It should be noted that the amplitude calibration could have been carried out in advance on both raw signals delivered by the sensors $CA_1$ to $CA_3$ so that subsequent linear combinations are more effective in eliminating the order 3 harmonic. The disadvantage of this method lies in the fact that a supplementary adjustment is necessary and that it does not correct any disparities in amplification of the linear combinations themselves.

Once the two sinusoids have been obtained (curves $C_1$ and $C_3$), it becomes possible to extract directly the value of the angular position θ. To do this, by dividing the two signals represented by the curves $C_1$ and $C_3$, one eliminates the amplitude, then, using a mathematical function or a table, one may invert the function and determine the angular quadrant using the signs of the signals. For the sake of clarity, by way of non-limiting example, if the phase shift between signals is $\phi=90°$, for example, this is an arctangent function Again, for a more detailed description, it would be advantageous to refer back to the description in the previously cited international patent application WO 2006/010864 A2. The method according to WO 2006/010864 A2 gives good results and achieves the aims set by this patent application, at least if the signals really do approach a pure sinusoidal function (that is, presenting few harmonics and little noise). In practice, these operating conditions, which may be referred to as "ideal", are rarely found. It follows that, again in practice, the method just mentioned often proves to be unsatisfactory.

The object of the invention is to propose a method, for detecting the angular position which obviates the disadvantages of prior art, firstly, some of which have just been recalled, and secondly, more robust, while not significantly increasing either the complexity or the cost.

To do so, according to an essential characteristic, the method used in the device according to the invention consists of estimating the real angular position of the rotor of the rotary electrical machine from sinusoidal signals obtained by linear combinations of the signals from sensors, as in WO 2006/010864 A2, but using locking between a real angular position and an estimated angular position. The device of the invention includes a feedback loop, which will be referred to as a "tracking loop", the behaviour of which is similar to that of a phase lock loop or "PLL" according to the Anglo-Saxon terminology currently in use.

The circuits composing the device for detecting the angular position of the stator are configured such that the following relation (1) is satisfied:

$$(\sin(\theta_{real}+\phi_1)\cdot\sin(\theta_{est}+\phi_2)-\sin(\theta_{real}+\phi_2)\cdot\sin(\theta_{est}+\phi_1)$$
$$=\sin(\phi_2-\phi_1)\cdot\sin(\theta_{real}-\theta_{est}),$$

relation in which:
- $\theta_{real}$ represents the real angular position of the rotor;
- $\theta_{est}$ represents the estimated angular position of the rotor; and
- $\phi_1$ and $\phi_2$ represent the phase shifts of the signals corresponding to the angular offsets of the sensors in relation to an angular reference marker linked to the stator of the rotary electrical machine.

It follows that $\phi=(\phi_1-\phi_2)$ is a constant (these two phase shifts being determined from a single angular reference marker), and represents the phase shift between the signals $\theta_{real}$ and $\theta_{est}$.

This relation makes it possible to obtain an error signal between the real angular position and the estimated angular position.

The loop known as the tracking loop makes it possible to minimise the error between $\theta_{real}$ and $\theta_{est}$. If this error becomes low, it is well known that $\sin(\theta_{real}-\theta_{est})$ is more or less equal to $(\theta_{real}-\theta_{est})$. The second term of the relation (1) then becomes more or less equal to $K(\phi_1-\phi_2)$, with K constant equal to $\sin(\phi)$.

Moreover, the inventive entity has demonstrated that phase shifts of 120° and more particularly 60° between the electrical signals generated by the sensors are particularly beneficial in suppressing harmonic 3.

So the principal object of the invention is a device for detecting the angular position of a rotor of a polyphase rotary electrical machine containing a stator and a plurality of magnetic field sensors, fixed with respect to the stator and capable of delivering first signals representing a rotating magnetic field detected by said sensors.

According to the invention, the device for detecting the angular position includes means for generating, from linear combinations of said first signals, at least first and second sinusoidal signals, phase-shifted by a determined value $\phi$ different from zero and from 180°, representing an angular position of the rotor referred to as real, in that it includes means for detecting a value for the angular position of the rotor referred to as estimated by locking between said real and estimated angular positions by making use of a feedback loop referred to as "tracking", reinjecting as input at least the third and fourth sinusoidal signals determined on the basis of said estimated angular position value and phase-shifted by said determined value $\phi$, and in that said means for detecting the estimated value of the angular position of the rotor include first and second means of multiplication of said first and third signals, firstly, and said second and fourth sinusoidal signals, secondly, and of subtracting the results of these multiplications, such that the following relation is satisfied at any moment:

$$(\sin(\theta_{real}+\phi_1)\cdot\sin(\theta_{est}+\phi_2)-\sin(\theta_{real}+\phi_2)\cdot\sin(\theta_{est}+\phi_1)$$
$$=\sin(\phi_2-\phi_1)\cdot\sin(\theta_{real}-\theta_{est}),$$

relation in which $\theta_{real}$ and $\theta_{est}$ are said real and estimated angular positions, $\phi_1$ and $\phi_2$ the phase shifts of said first and second sinusoidal signals in relation to a reference marker linked to said stator and said detected phase shift $\phi$ being equal to $(\phi_2-\phi_1)$.

A further object of the invention is a polyphase rotary electrical machine.

BRIEF DESCRIPTION OF THE DRAWINGS

The invention will now be described in more detail, making reference to the attached drawings, in which.

DETAILED DESCRIPTION OF THE PREFERRED EMBODIMENTS

In the following description, without in any way limiting its scope, the following scenario relates to the preferred application of the invention, unless otherwise stated, i.e. that of a device for detecting the angular position of the rotor of an alterno-starter using locking between a measured angular position and an estimated angular position.

Figure 4:
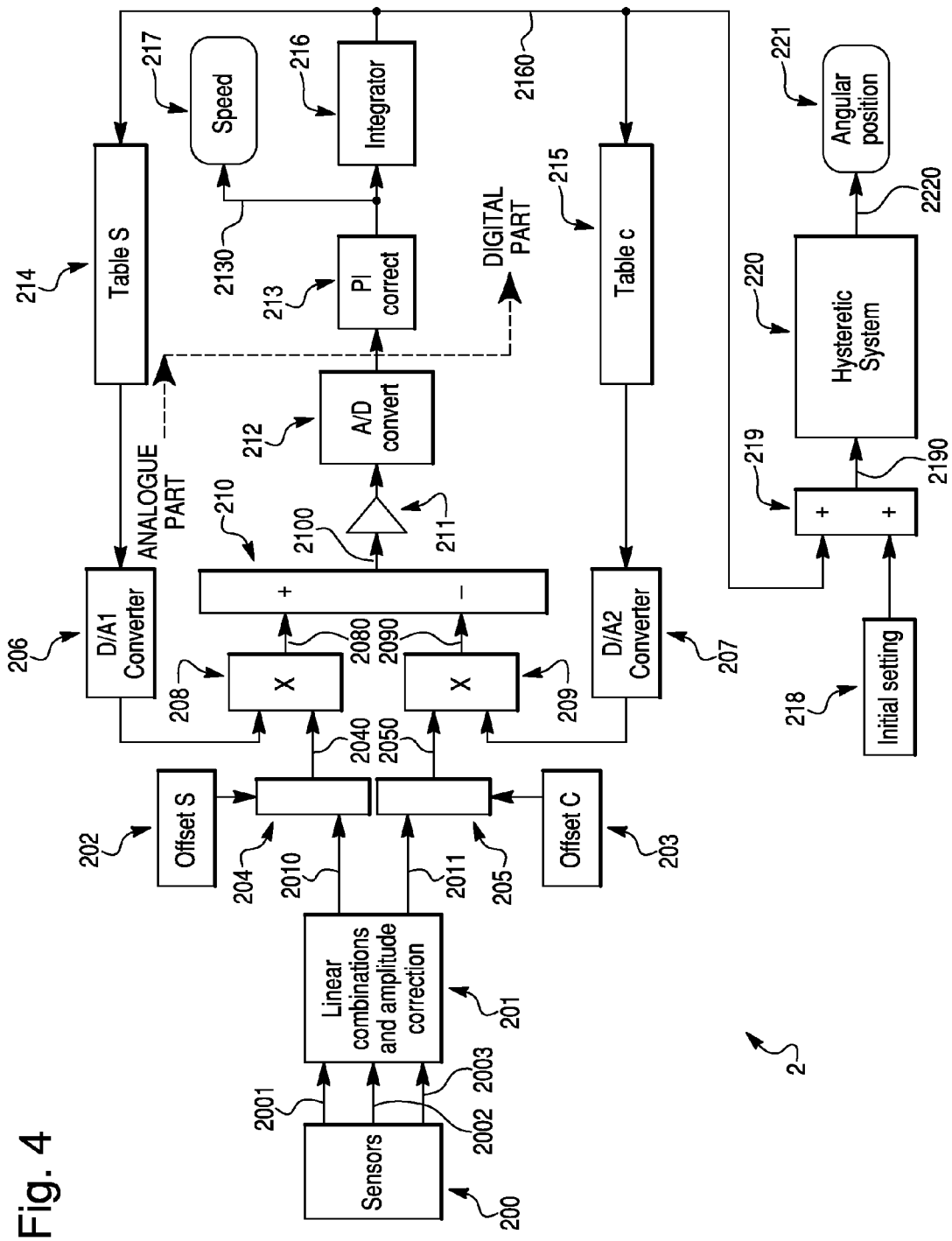
FIG. 4 illustrates an embodiment of a complete device for detecting the angular position of a rotor from an alterno-starter according to a preferred embodiment of the invention.

FIG. 4 illustrates an example of a device 2 for detecting the angular position of the rotor of an alterno-starter according to a preferred embodiment of the invention.

The alterno-starter (not shown in this figure) may be of a type very similar to the prior art, even identical. It may, for example, be the alterno-starter 10 from FIG. 1. Again, the sensors from the block 200 have the same function as those from FIG. 1. In the particular form described here, for example, three Hall-effect sensors are used ($CA_1$ to $CA_3$) arranged at 120° electric. Of course, the invention is not limited to this number of sensors and to this particular angular relation of 120° between them. As indicated above, an angular relation of 60° between the sensors is very beneficial in suppressing harmonic 3. According to particular applications of the invention, the person skilled in the art will select the number of sensors and the angular relation between them which is most appropriate to the application in question.

Figure 2:
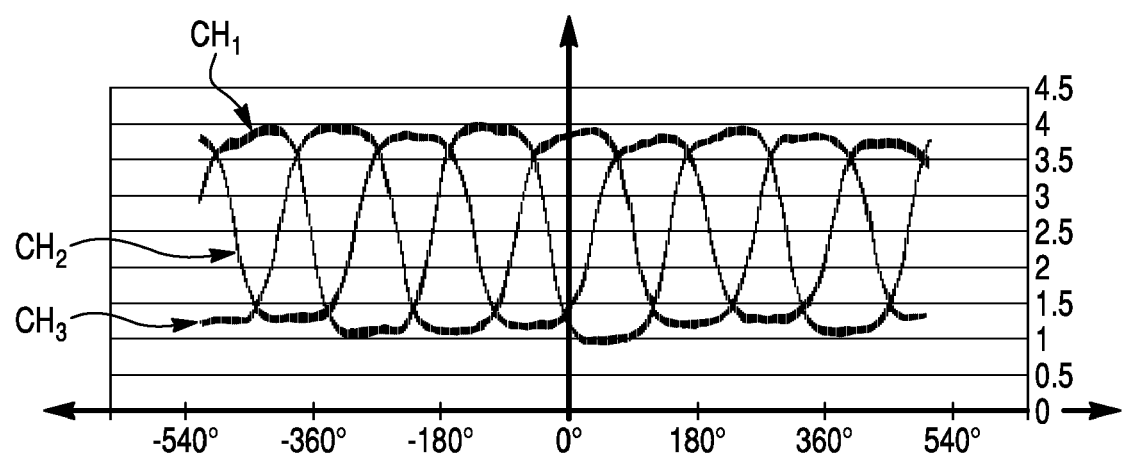
FIG. 2 is a diagram illustrating an example of signals delivered by three magnetic sensors for measuring the angular position of the rotor used in the device from FIG. 1.
Figure 3:
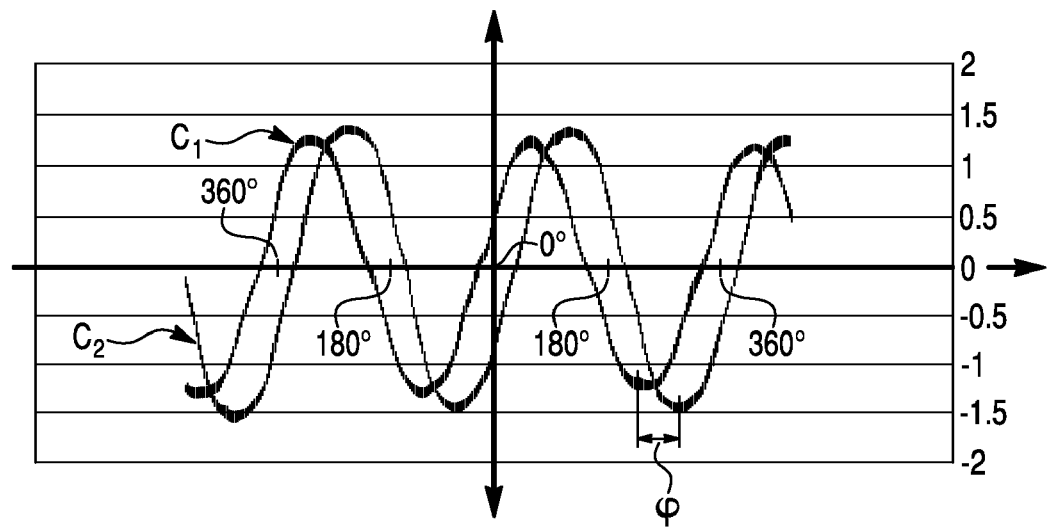
FIG. 3 is a diagram illustrating two phase-shifted sinusoidal signals obtained by a linear combination of the preceding signals, usable to determine the angular position of the rotor.

In this embodiment, the sensors $CA_1$ to $CA_3$ deliver at interfaces 2001 to 2003 three "raw" signals of the type illustrated by FIG. 2, which are sent to a module 201 of linear combinations and amplitude correction, generating at its outputs, interfaces 2010 and 2011, two signals of the type of those illustrated by FIG. 3.

The modules, 204 and 205, apply to these signals the offset values delivered by modules 202 and 203 respectively. The modules 202 and 203 can be constituted by memory circuits containing predetermined offset values.

At the outputs 2040 and 2050 of modules 204 and 205, there are thus available two sinusoidal signals centred on an axis (i.e. without offset) and of the same amplitude, phase-shifted by a determined non-obvious value $\phi$ (FIG. 3: $C_1$ and $C_2$), i.e. different from 0° or 180°.

Figure 1:
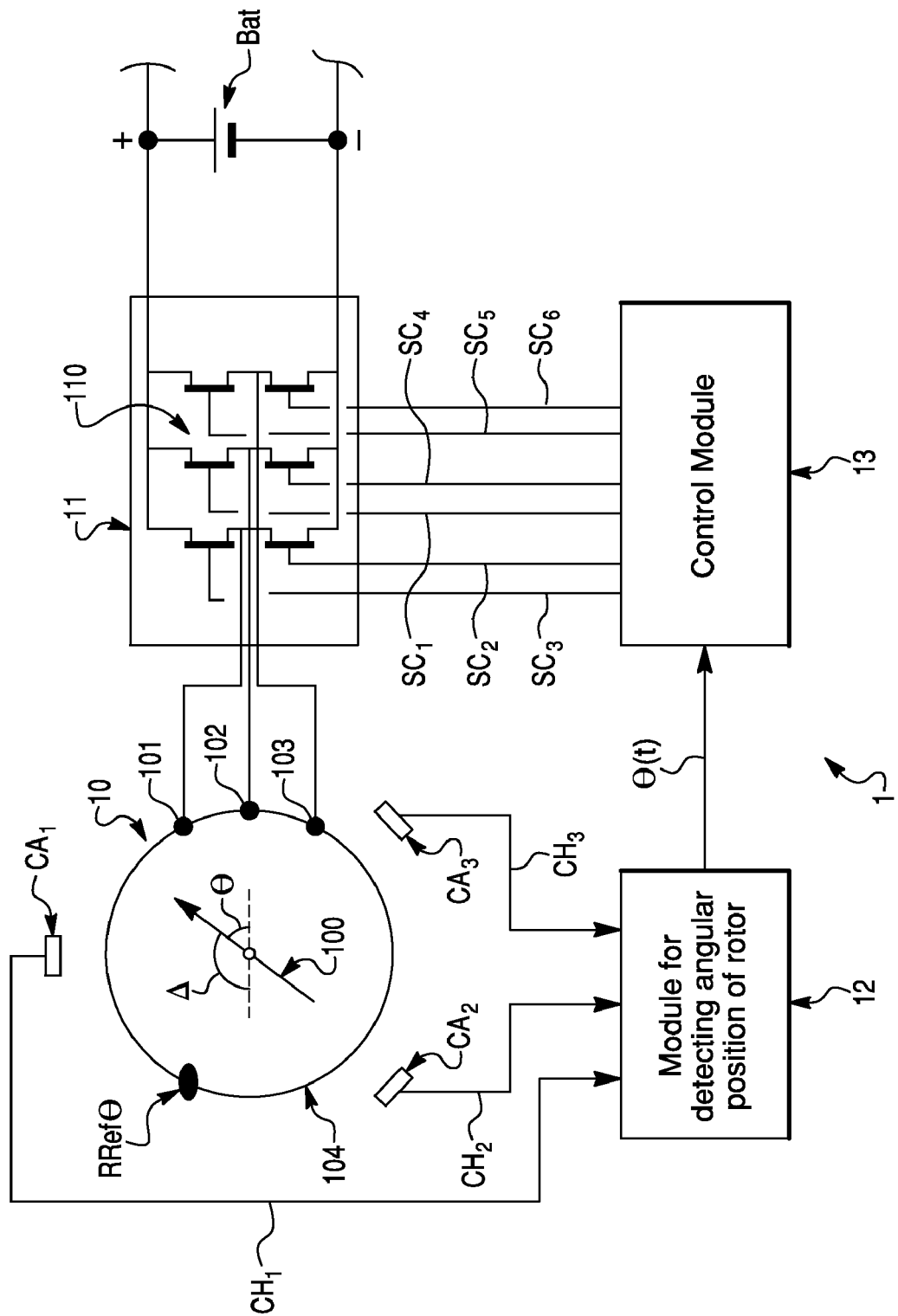
FIG. 1 illustrates in diagram form an embodiment of a device for detecting the angular position of a rotor of an alterno-starter according to prior art.

These two components, derived from the signals measured by the sensors 200 (FIG. 2: CH1 to CH3), and shaped to best approach sinusoidal functions, are each sent to the first inputs of analogue multipliers, 208 and 209, respectively, via the interfaces 2020 and 2040. So they represent two instances of the instantaneous value of the measured angular position of the rotor 100 (FIG. 1). These analogue multipliers 208 and 209 receive at second inputs two components derived from the instantaneous value of the angular position estimated by two feedback branches which will be detailed below, in accordance with one of the essential characteristics of the invention, which has been named "tracking loop". So at outputs 2080 and 2090 the results of the two multiplications of the first member of the relation (1) are obtained.

$$(\sin(\theta_{real}+\phi_1)\cdot\sin(\theta_{est}+\phi_2)-\sin(\theta_{real}+\phi_2)\cdot\sin(\theta_{est}+\phi_1)$$
$$=\sin(\phi_2-\phi_1)\cdot\sin(\theta_{real}-\theta_{est})$$

The output signals from the two multiplication modules 208 and 209 are sent to a module 210 which effects the analogue subtraction of these signals, more precisely the signal at the output interface 2080 of module 208 is sent to a "+" input and the signal at the output interface 2090 of module 209 to a "−" input of module 210. So, one obtains the result of the subtraction of the first member of the aforementioned relation (1) as output 2100 of module 210.

Where necessary, the output signal from module 210 is amplified by a fixed-gain G amplifier 211, then converted into a digital signal by an analogue-digital converter 212.

Up to this point, the circuits of the device 2 are of the analogue type.

The two following stages, before applying feedback, are constituted by a digital correction module 213, of the proportional integral type referred to as "PI", followed by a "pure" digital integrator module 216, as previously indicated.

The output 2130 of module 213 gives the speed of the rotor 100 (FIG. 1) and is sent to a module 217 to process this signal, for example a display device.

The output 2160 of the integrator 216 gives the estimated angular position and is looped, by two parallel branches, to the second inputs of the multipliers 208 and 209.

The estimated position makes it possible to address two tables directly (or again, a single table used twice by multiplexing access, once for the estimated position and again by the sum of the estimated position and a constant digital offset representing a pre-calibrated phase shift) containing the desired sinuses. These tables may be constituted by memories, for example of the read-only memory (ROM) type.

In the embodiment described in FIG. 4, the branches, which will be referred to arbitrarily as the upper and lower respectively, each contain, in cascade, a table 214 and 215 respectively, (also referred to as "Table S" and "Table C") addressed by the digital signal present at the output of module 216, and a digital-analogue converter 206 and 207 (also referred to as "NA1" and "NA2"). This arrangement makes it possible to move from the digital part of the device 2 to the analogue part thereof constituted by input organs up to module 212.

The upper branch (output of the digital-analogue converter 206) sends the following signal to the second input of the analogue multiplier 208:

$$S_s = A_s(\sin(\theta_{est})), \text{ calculated by Table } S\ 214 \qquad (2)$$

The lower branch (output of the digital-analogue converter 207) sends the following signal to the second input of the analogue multiplier 209:

$$S_c = A_c(\sin(\theta_{est}+\phi)), \text{ calculated by Table } S\ 215 \qquad (3),$$

$\phi$ representing the phase shift ($\phi_2-\phi_1$) between the two sinusoidal signals looped as inputs of the device 2. This phase shift $\phi$ depends on the positions of the sensors (FIG. 1; $CA_1$ to $CA_3$), especially their positions in relation to the angular reference marker RRef$\theta$ (FIG. 1), any offsets in the measurement signals and a certain number of physical parameters connected with the practical embodiment of the device 2, in particular the real characteristics of the alterno-starter 10, of the measurement sensors $CA_1$ to $CA_3$, etc. The simplest solution is to determine a constant, pre-calibrated phase shift value $\phi$ theoretically, and to implement it in the table 215.

It should be noted that the operation of calibrating signals amplitudes $C_1$ and $C_2$ (FIG. 3) resulting from the linear combinations may be done directly in the digital tables, 214 and 215, by adjusting the amplitudes of the sinuses included in these tables, instead of processing this operation in the module 201. In relations (2) and (3) this calibration is obtained by multiplying the sinuses by constants $A_s$ and $A_{c1}$ respectively.

It can be arranged that $\phi_1=0$ (in this case $\phi=\phi_2$) and that the amplitudes of all the sinusoidal signals are equal (this is the case if said calibration is done correctly). Taking account of said relations (2) and (3), and of the signals injected at the first inputs of the multiplier modules, 208 and 209, one obtains, at output 2100 of the subtractor 210, the following signal:

$$V_{2100}=\sin(\theta_{real})\cdot\sin(\theta_{est}+\phi)-\sin(\theta_{real}+\theta)\cdot\sin(\theta_{est}) \qquad (4)$$

A classic trigonometric calculation allows the following relation (4a) to be found:

$$V_{2100}=\sin(\theta_{real})\cdot\sin(\theta_{est}+\phi)-\sin(\theta_{real}+\phi)\cdot\sin(\theta_{est})=\sin(\theta_2-\theta_1)\cdot\sin(\theta_{real}-\theta_{est})$$

Or, again:

$$V_{2100}=\sin(\theta_{real})\cdot\sin(\theta_{est}+\phi)-\sin(\theta_{real}+\phi)\cdot\sin(\theta_{est})=\sin(\phi)\cdot\sin(\theta_{real}-\theta_{est}) \qquad (4b)$$

since $\phi=(\phi_2-\phi_1)=\phi_2$ as indicated above.

When the error tends towards zero, $\sin(\theta_{real}-\theta_{est})$ may be confused with the error itself $(\theta_{real}-\theta_{est})$.

Relation (4b) thus becomes identical to relation (1), according to the method of the invention.

Purely digital processing is also possible, as the signals $C_1$ and $C_2$ (FIG. 3) originating from the linear combinations have been digitised by sampling. In this case, the multiplication may be done digitally, which simplifies processing. On the other hand, this method, while it can simplify certain operations, is not without difficulty. It is in fact necessary to ensure the instantaneity of the two samplings and especially the quality of the resolution, since the input error of the loop calculated by difference thus ends up under-sampled.

The output 2160 of the integrator 216 theoretically makes it possible to obtain the required "estimated angular position" $\theta(_t)$. However, it is generally necessary to apply an initial setting value, for example memorised in the module 218 and added to the signal present at the output of the integrator 216. This initial setting value gives the true physical angular position of the rotor 100 (FIG. 1) for an initial reference value $\theta=0$. This operation is realised by a digital adder 218, the output of which represents a corrected estimated angular position value.

Finally, in certain operating conditions (for example, due to noise or high frequency instability of the loop), arbitrary fluctuations of the estimated angular position value $\theta(_t)$ may arise which are detrimental to the proper operation of the reversible AC-DC power converter 11 and may even cause deterioration of the semi-conductor components 110. Also, in one preferred embodiment, a "hysteretic" filtration is applied to the output signal 2190 of the digital adder 219: module 220. At the filtered output 2220 of the hysteretic system 220, a signal is obtained which represents an estimated angular position $\theta(_t)$ which is fully usable by the control module 13 to generate six correctly phase-shifted signals to control the bridges 110 of the reversible AC-DC power converter 11.

Figure 5:
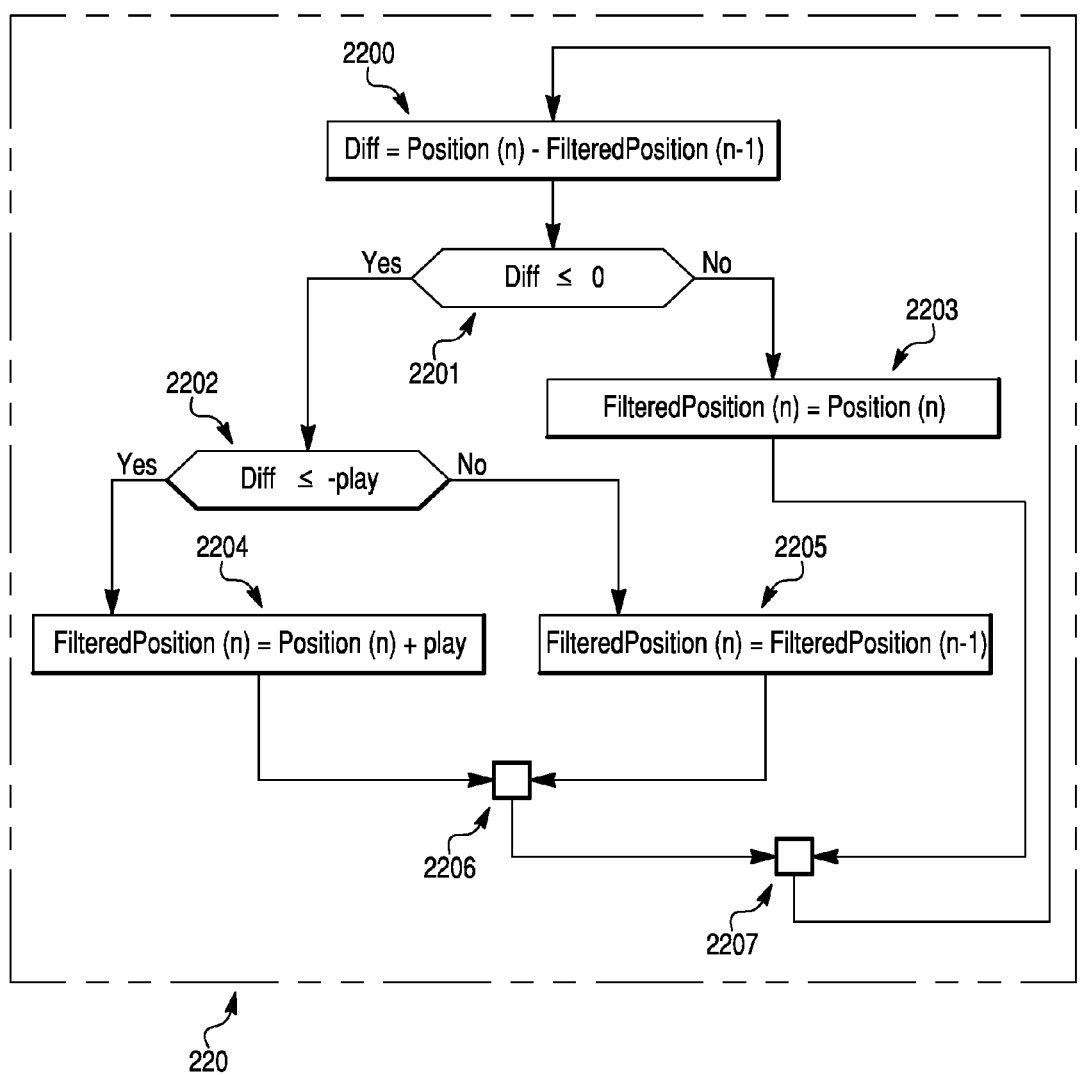
FIG. 5 illustrates a block diagram of the functions of a supplementary module used in the device from FIG. 4, implementing a hysteretic filtering system.

FIG. 5 is a block diagram illustrating one embodiment of a hysteretic filtering system 220 which can be used in the device 2 from FIG. 4.

The hysteretic filtering system functions, by analogy, like mechanical play in a gearing: when there is a change in direction of speed, a driven pinion does not reverse its position until any play between the teeth has been taken up, i.e. when the change in direction of speed has caused a displacement of the driving pinion equal to the play. It is possible to reproduce this behaviour by using the iterations described by the block diagram in FIG. 5. Hereafter "play" will be used to refer to the value of this play, a value which depends on a certain number of physical parameters linked to the organs used in a real system 1 as in FIG. 1.

In the block 2200, the value of the difference is calculated, thus "Difference" between the position filtered at stage (n−1), thus "FilteredPosition (n−1)" and the position at stage n, thus "Position(n)", n being an arbitrary whole number. In the block 2201, the "Difference" value is compared to zero. If the result of the comparison is less than or equal to zero ("YES" branch), the "Difference" value is sent to block 2202, if not, ("NO" branch), it is sent to block 2203. In block 2203, the value of the filtered position at stage n, i.e. "FilteredPosition (n)" is forced to the value of the position at stage n, i.e. "Position(n)". In the block 2202, the "Difference" value is compared to the "-play" value. If the result of the comparison is less than or equal to "-play" ("YES" branch), the "Difference" value is sent to block 2204, if not, ("NO" branch), it is sent to block 2205. In block 2204 the value "FilteredPosition (n)" is forced to the value "FilteredPosition(n)+jeu". In block 2205 the value "FilteredPosition(n)" is forced to the value "FilteredPosition(n−1)". The outputs of blocks 2204 and 2205 are added in a block 2206 and the output from this block 2206 is added to the output from block 2203. Finally, the output from block 2207 is looped to the input of block 2200 to do a new iteration (stage n+1).

The hysteretic filtering system 220 according to the block diagram from FIG. 5 makes it possible to apprehend the functioning of an electrical machine able to rotate in two directions, as is the case of the alterno-starter 10 from FIG. 1.

If the direction of control of the rotary electrical machine can only be unidirectional, it is sufficient to use an infinite "play" value, so that the position is only sent when it increases (anti-return type device equivalent to that of a wheel known as "ratcheted" in mechanics).

On reading the above, it can easily be seen that the invention certainly achieves the aims set by it, and there is no need to recapitulate all of it.

However, it will be recalled that the implementation of what has been referred to as a "tracking loop" makes it possible precisely to adjust the passband of the angular position $\theta(t)$ signal and the acceleration dynamics of a rotary machine (in engine mode). This characteristic allows the noise interfering with the angular position $\theta(t)$ signal to be eliminated more effectively.

However, the invention is not merely limited to the device according to the embodiment explicitly described with respect to FIGS. 4 and 5, nor merely to the preferred application relating to the detection of the angular position of the rotor of a three-phase alterno-starter with a view to controlling a reversible rectifier device arranged between this alterno-starter and a source of DC electrical energy, for example a rechargeable battery (FIGS. 1 to 5).

Without exceeding the scope of the invention, the device can be applied to any polyphase rotary machine, for example biphase, triphase, hexaphase, etc., in engine (starter) mode, and/or alternator mode (current generator).

The invention claimed is:

1. A device for detecting an angular position of a rotor of a polyphase rotary electrical machine containing a stator and a plurality of magnetic field sensors, fixed with respect to the stator and capable of delivering first signals representing a rotating magnetic field detected by said sensors, comprising:

means for generating (201), from linear combinations of said first signals (2001-2003), at least a first sinusoidal signal (2010) phase-shifted by a fixed value $\phi_1$ and a second sinusoidal signal (2011) phase-shifted by a fixed value $\phi_2$, wherein a fixed phase shift value $\phi$ is different from zero and from 180°, and wherein said sinusoidal signals represent a real angular position of the rotor (100);

means for detecting an estimated angular position value of the rotor (100) by locking from said real angular position using a feedback tracking loop and injecting at least a third and a fourth sinusoidal signals as an input, wherein said third and fourth sinusoidal signals are determined based on said estimated angular position value and are phase-shifted from said fixed phase shift value $\phi$;

means for multiplying (208) said first sinusoidal signal and said third sinusoidal signal to obtain a first result (2080);

means for multiplying (209) said second sinusoidal signal and said fourth sinusoidal signal to obtain a second result (2090); and means for subtracting (210) said first and second results, so that the following relation is satisfied at any instant:

$\sin(\theta_{real}+\phi_1)\cdot\sin(\theta_{est}+\phi_2)-\sin(\theta_{real}+\phi_2)\cdot\sin(\theta_{est}+\phi_1)=\sin(\phi_2-\phi_1)\cdot\sin(\theta_{real}-\theta_{est})$, wherein $\theta_{real}$ and $\theta_{est}$ are said real and estimated angular positions, $\phi_1$ and $\phi_2$ are phase shifts of said first and second sinusoidal signals in relation to a reference marker (RRef θ) linked to said stator (104) and said fixed phase shift φ being equal to ($\phi_2 - \phi_1$).

2. Device according to claim 1, wherein said means for multiplying are defined by a first and a second analogue multiplier circuits (208-209), wherein said first analogue multiplier circuit (208) receives at a first input said first sinusoidal signal and at a second input said third sinusoidal signal, and wherein said second analogue multiplier circuit (209) receives at a first input said second sinusoidal signal and at a second input said fourth sinusoidal signal.

3. Device according to claim 2, wherein said means of subtraction are constituted by an analogue subtraction circuit (210) receiving at a first adding input (+) the output signal (2080) from said first multiplier circuit (208) and at a subtractive input (−) the output signal from said first multiplier circuit (209) so as to generate at its output a signal equal to $[\sin(\theta_{real}+\phi_1)\cdot\sin(\theta_{est}+\phi_2)-\sin(\theta_{real}+\phi_2)\cdot\sin(\theta_{est}+\phi_1)]$.

4. Device according to claim 1, wherein said means of detecting said estimated value of the angular position of the rotor contain, arranged as a cascade at the output from said analogue subtraction circuit (210), a fixed-gain analogue amplifier (211), an analogue-digital converter (212), a digital corrector module (213), of the proportional integral type known as "PI" and a digital integrator module (216), said digital corrector module (213) supplies at its output (2130) a digital signal representing the speed of rotation of said rotor (217) and wherein said digital integrator (216) supplies at its output (2160) a signal representing said estimated angular position.

5. Device according to claim 4, wherein said feedback loop contains first and second parallel branches, said first branch containing, in cascade, a first digital table (214) addressed by said signal representing said estimated angular position (2160) and generating as output a digital sinusoidal value representing said third sinusoidal signal and a first digital converter (206) converting said digital sinusoidal value into an analogue signal sent to the second input of said first multiplication circuit (208), and wherein said second branch includes, in cascade, a second digital table (215) addressed by said signal representing said estimated angular position (2160) and generating as output a digital sinusoidal value representing said fourth sinusoidal signal and a second digital converter (207) converting said digital sinusoidal value into an analogue signal sent to the second input of said second multiplication circuit (209).

6. Device according to claim 5, wherein said first and second digital tables (214-215) are constituted by read-only memories.

7. Device according to claim 6, wherein said means for detecting the estimated angular position value of the rotor (100) comprise means (218-219) for applying to said estimated angular position value an initial setting value giving the true physical angular position of said rotor (100) for an initial reference value of zero.

8. Device according to claim 7, wherein said means for applying a setting value consist of a memory (218) storing said value and a digital adder (219) adding the setting value and said estimated angular position value, so as to generate as output (2190) a corrected estimated angular position value.

9. Device according to claim 8, wherein said means for detecting an estimated angular position value of the rotor (100) further include hysteretic filtering means (220) arranged at the output of said digital adder (219).

10. Device according to claim 8, wherein said polyphase rotary electrical machine (10) is an alternator-starter.

11. Device according to claim 1, wherein said first signals ($CH_1$-$CH_3$) are triphase.

12. Device according to claim 1, wherein the fixed phase shift value φ between the first and second sinusoidal signals ($CH_1$-$CH_3$) is 60° or 120°.

13. Polyphase rotary electrical machine containing a rotor (100) and a stator (104) comprising a device (2) for detecting the angular position of said rotor (100) according to claim 1.

\* \* \* \* \*